United States Patent
Clemm et al.

(10) Patent No.: US 7,502,847 B2
(45) Date of Patent: Mar. 10, 2009

(54) METHOD OF PROVIDING VIEWS OF A MANAGED NETWORK THAT USES NETWORK ADDRESS TRANSLATION

(75) Inventors: Alexander Clemm, Los Gatos, CA (US); Petre Dini, San Jose, CA (US); Fong Shen, San Jose, CA (US); Raji Sridar, San Jose, CA (US); Apparao Tayi, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 932 days.

(21) Appl. No.: 10/697,405

(22) Filed: Oct. 29, 2003

(65) Prior Publication Data

US 2005/0114495 A1   May 26, 2005

(51) Int. Cl.
*G06F 15/173* (2006.01)
(52) U.S. Cl. .................................................. 709/224
(58) Field of Classification Search ............... 709/224
See application file for complete search history.

(56) References Cited

U.S. PATENT DOCUMENTS

| | | | |
|---|---|---|---|
| 6,425,008 B1* | 7/2002 | Lecheler et al. | 709/224 |
| 6,636,983 B1* | 10/2003 | Levi | 714/4 |
| 6,763,384 B1 | 7/2004 | Gupta et al. | |
| 6,944,659 B2* | 9/2005 | Taggart et al. | 709/224 |
| 6,978,265 B2* | 12/2005 | Schumacher | 707/4 |
| 2002/0156882 A1* | 10/2002 | Natarajan et al. | 709/224 |
| 2003/0097438 A1* | 5/2003 | Bearden et al. | 709/224 |
| 2003/0105856 A1* | 6/2003 | Tse et al. | 709/224 |
| 2003/0110398 A1* | 6/2003 | Dacier et al. | 713/201 |
| 2003/0177183 A1* | 9/2003 | Cabrera et al. | 709/204 |
| 2004/0213224 A1* | 10/2004 | Goudreau | 370/389 |

OTHER PUBLICATIONS

D. Perkins. SNMP Alarms and MIB Module, draft-ietf-disman-snmp-alarm-mib-01.txt. http://www3.ietf.org/proceedings/01aug/I-D/draft-ietf-disman-snmp-alarm-mib-01.txt. Mar. 2, 2001.*
International Searching Authority, International Search Report and Written Opinion, PCT/US04/35867, Oct. 27, 2004, 8 pages.

(Continued)

*Primary Examiner*—Andrew Caldwell
*Assistant Examiner*—John M MacIlwinen
(74) *Attorney, Agent, or Firm*—Hickman Palermo Truong & Becker LLP (57) ABSTRACT

A method and mechanism for communicating an alarm in a computer network is provided. An alarm system enables a MSP to accurately determine which device within a computer network is associated to a received alarm. Initially, an event is detected on a device on the computer network. An alarm is propagated to an alarm identification component. The alarm identification component augmenting the alarm with identification information to result in creating an augmented alarm. Thereafter, the augmented alarm is transmitted to a network operations center for the computer network. The network operations center may process the alarm using the additional information in the alarm. Accordingly, using the augmented alarm, the MSP is able to accurately determine the identity of the originating device, regardless of whether the customer site of the originating device uses NAT or a private IP addressing scheme.

80 Claims, 5 Drawing Sheets

OTHER PUBLICATIONS

Current Claims in International Patent application PCT/US04/35867, 4 pages.

Cisco Systems, Inc., "Chapter 3, Configuring Network Devices for Management," Cisco Media Gateway Controller Node Manager 2.1 User's Guide, undated, http://www.cisco.com/univercd/cc/td/doc/product/access/sc/rel9/cmnm21/cmnm2xcd.pdf, pp. 3-1-3-8.

Microsoft Corporation, "Chapter 02—Network Devices," http://www.microsoft.com/technet/treeview/default.asp?url=/technet/itsolutions/edc/pak/sog/EDCOPS02.ASP, printed Dec. 4, 2003, pp. 1-11.

ProactiveNet Inc., MonitorWizard—The Power to Import Custom Data, Augmenting Performance Data with Mission-critical Data, 2002, http://www.avoka.com/resources/proactivenet/MetaAPI.pdf, 6 pages.

* cited by examiner

METHOD OF PROVIDING VIEWS OF A MANAGED NETWORK THAT USES NETWORK ADDRESS TRANSLATION

FIELD OF THE INVENTION

The present invention relates to communicating an alarm in a computer network.

BACKGROUND OF THE INVENTION

A managed service provider (hereinafter a MSP) is an entity, usually a business, which manages one or more computer networks that are each used by other entities (usually customers of the MSP). MSPs are advantageous when a small business desires to outsource the management of its own computer network to the MSP. In order to effectively manage one or more computer networks for each of its customers, a MSP requires an accurate view of its customer's computer networks.

Alarms may be raised spontaneously on elements or devices of the computer network at a customer site. An alarm is a notification that an undesirable condition or event has occurred or is occurring at a device. For example, an alarm may be raised if the network bandwidth available to a device falls below a specified level, or if a device on the computer network experiences a specified condition, e.g., the utilization of a processor on the device is over 90%. Alarms may be initiated using a variety of techniques, e.g. an alarm for a device may be initiated by the device itself or by another entity.

After being initiated, alarms are transmitted to the MSP for processing. An alarm may be received by the MSP at a network operations center (hereinafter a NOC). MSPs use alarms in the management of the computer network. Information contained within the alarm enables the MSP to monitor conditions at the customer site where the alarm was raised.

In order to determine which customer site is associated with each received alarm, the MSP maintains a repository that associates devices on the computer network to customer sites. Generally, devices are identified in the repository by a unique identifier, e.g., a unique IP address. When an MSP receives an alarm, the MSP examiners the IP address contained within the alarm to determine which device is associated with the alarm. Once the particular device associated with the alarm is known by the MSP, the customer site in which the alarm originated may be determined by consulting the repository.

However, a MSP may be unable to accurately determine which device is associated with the alarm. The alarm could have originated at a customer site that uses a private IP address space. In that case, the alarm will contain the private IP address of the device at the customer site associated with the alarm. For example, a SNMP trap, which is a common mechanism used to initiate an alarm, will reflect the private IP address of the device at the customer site associated with the alarm. Different customers may use the same range of private addresses. Consequently, it is possible for devices at different customer sites that are using private IP addresses to have the same private IP address, which makes it difficult for the MSP to subsequently determine which device is associated with the alarm.

In addition, in some cases, a device may not even be known to the MSP, i.e., a device may be associated with an address that is not known or recognized by the MSP. However, the MSP would still need to determine which customer site raised the alarm associated with the unknown device. In the same vein, a customer of a MSP would still prefer that all devices at the customer site (not just those devices that are known to the MSP) be monitored by the MSP.

This problem is presented to a MSP when the customer site in which the alarm originated uses Network Address Translation. Network Address Translation, or NAT, allows multiple devices within a private network to share a single public IP address (a public IP address is an IP address for a device outside of the private network in which the device resides). Consequently, if an alarm is initiated on a private network using NAT, the device signaling the alarm might not be capable of being uniquely identified based on the IP address contained within the alarm because a trap may contain either a private IP address or a public IP address for the device associated with the alarm.

In order to determine which device is associated with the alarm, a MSP is required to maintain a set of private IP addresses used by their customers that use NAT. Maintaining a set of private IP addresses for each customer that uses NAT is very resource intensive for the MSP and undesirably requires that the customer site keeps the MSP informed of the current state of their IP addressing scheme and/or the identity of the devices used at the customer site.

Because of the above problems, a MSP may be required to execute a dedicated instance of an alarm application at the NOC for each customer site. Alternatively, the MSP may attempt to either perform a device-specific lookup (which is difficult to perform because of the amount of current information that must be maintained), or avoid situations in which their customers use overlapped private IP addresses. However, there are situations when none of these options are either available or desirable, which results in the NOC being unable to unambiguously identify the originating device. As a result, it is often impossible or impractical for the MSP to have an accurate and consistent view of a computer system.

Moreover, applications at the NOC may need additional information associated with the alarm to facilitate the processing the alarm. However, this is undesirable because identifying information associated with the alarm involves resources at the NOC and requires the associated information to be maintained by the NOC, which may be costly or resource intensive.

Accordingly, there is an unaddressed need in the art for communicating an alarm in a computer network, while avoiding the problems and difficulties associated with the current state of the art.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for communicating an alarm in a computer network is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Architectural Overview

Figure 1A:
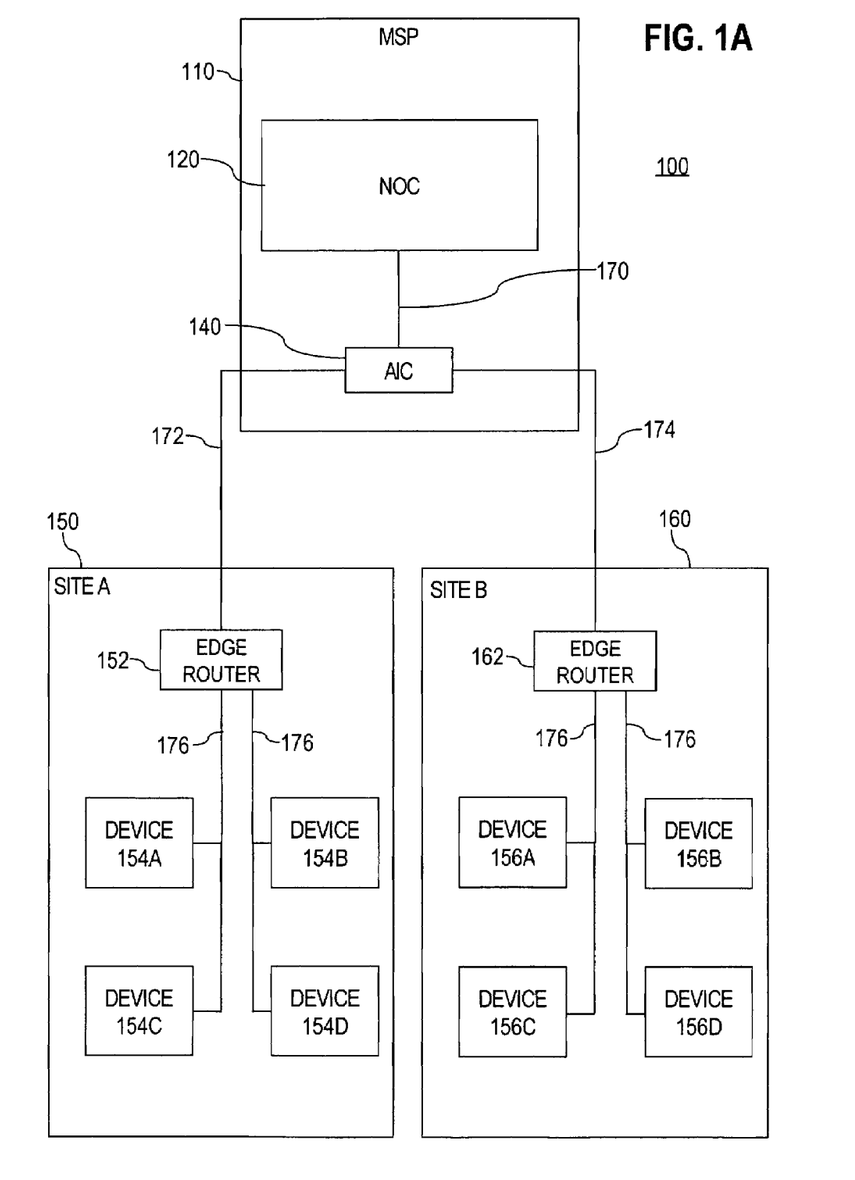
FIGS. 1A-1C are block network diagrams that depict an alarm system according to an embodiment.
Figure 1B:
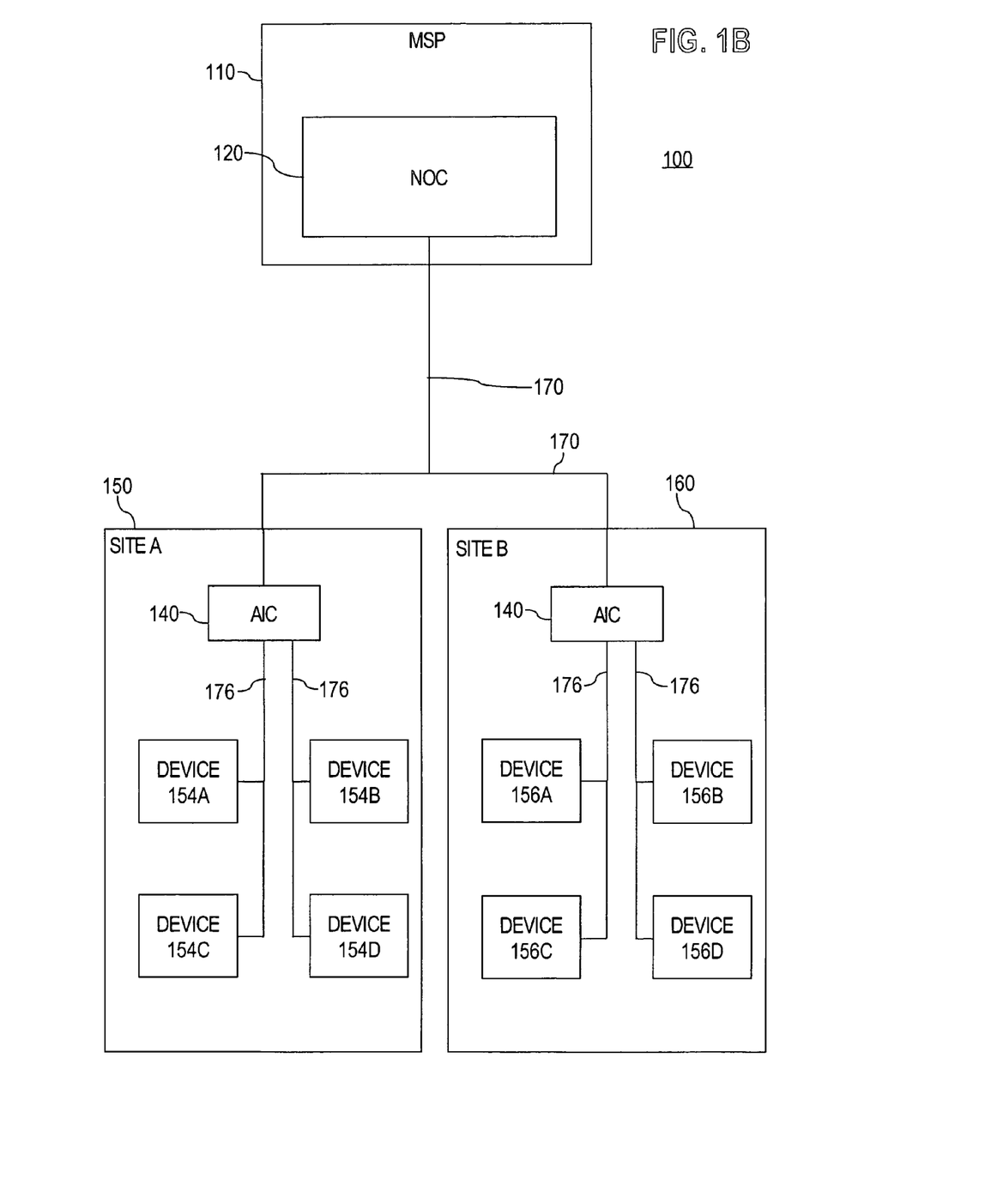
Figure 1C:
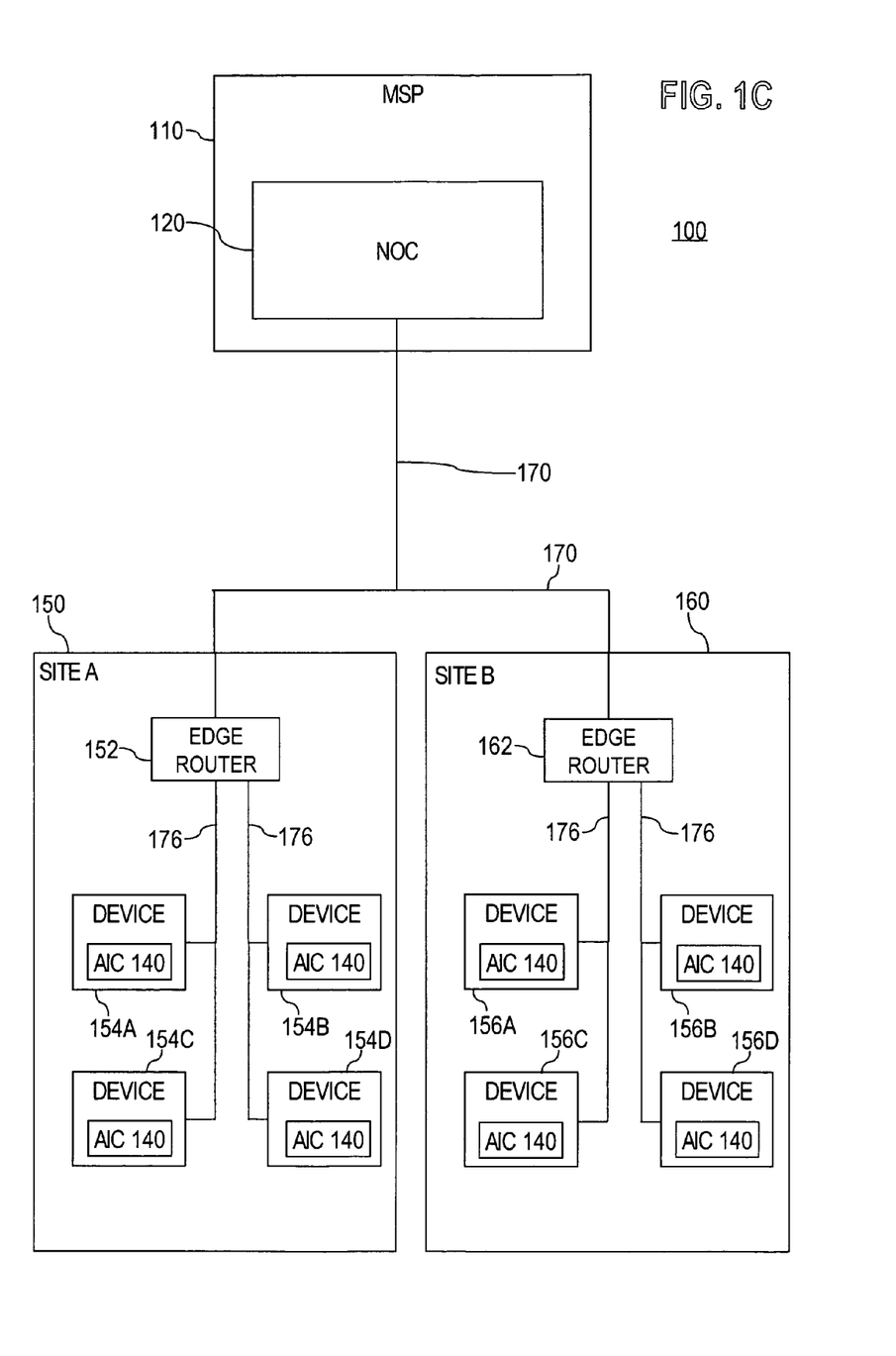

FIGS. 1A-1C are block network diagrams that each depict an alarm system 100 according to an embodiment. In an embodiment, alarm system 100 provides for communicating an alarm in a computer network. Alarm system 100 includes a managed service provider 110 (hereinafter a MSP 110), an alarm identification component 140 (hereinafter a AIC 140), and one or more sites, such as site 150 and site 160.

MSP 110 monitors one or more sites on a network accessible to MSP 110. For example, in FIGS. 1A-1C, MSP 110 monitor sites 150 and 160. In an embodiment, MSP 110 may manage the configuration of each device in a site monitored by MSP 110. For example, in the embodiment depicted in FIG. 1A, MSP 110 may monitor sites 150 and 160, and MSP 110 may manage the configuration of device 154A, 154B, 154C, 154D, 156A, 156B, 156C, and 156D.

In an embodiment, a MSP 110 includes a network operations center 120 (hereinafter a NOC 120). The term NOC is used broadly herein to refer to any software or hardware component that allows a MSP to receive and process alarms. In an embodiment, the NOC 120 processes alarms for each site on the network that the MSP 110 monitors. NOC 120 receives alarms augmented with identification information ("augmented alarms") over communications link 170. NOC 120 is configured to receive and process the augmented alarm to determine which device with alarm system 100 is associated with the augmented alarm.

The term "AIC," as used broadly herein, refers to any software or hardware component that is configured to augment alarms with identification information. The operation of AIC 140 is explained in further detail below in the section entitled "Communicating an Alarm In a Computer Network."

AIC 140 may be deployed within alarm system 100 at any position that enables the AIC 140 to process received alarms. For example, in the embodiment depicted in FIG. 1A, AIC 140 is deployed outside of multiple sites that are monitored by MSP 110, and in the embodiment depicted in FIG. 1B, AIC 140 is deployed inside each site being monitored by MSP 110, and in the embodiment depicted in FIG. 1C, AIC 140 is deployed at each device in each site being monitored by MSP. In other embodiments (not depicted), AIC 140 may be deployed within alarm system 100 at two or more different positions, e.g., AIC 140 could be deployed within alarm system 100 as shown in two or more of FIGS. 1A-1C.

The term "site," as used broadly herein, refers to any portion of a network that is capable of being monitored by MSP 110. For example, site 150 and site 160 may each correspond to a computer network of a small business that desires to outsource the management of its computer network to MSP 110. In another example, site 150 and site 160 may each correspond to different portions of a computer network of the same business that desires to outsource the management of its computer network to the MSP 110, e.g., site 150 and site 160 could each correspond to a different building of the same company, or to different floors within the same building of a single company.

Each site managed by MSP 110 may use network address translation without informing MSP 110 or any other site of the naming convention of the network address translation. For example, site 150 and 160 may each use network address translation independently from one other. For ease of explanation only two sites, namely site 150 and 160, are depicted in FIGS. 1A-1C; but alarm system 100 may contain any number of sites.

Each site within alarm system 100 may contain one or more devices. The term "device," as broadly used herein, refers to any software or hardware component that is capable of being associated with an alarm. An alarm is any form of notification that an undesirable condition or event has occurred or is occurring at a device, and includes SNMP messages, events tagged as alarms, etc. Alarms may be initiated using a variety of techniques, e.g. an alarm for a device may be initiated by the device itself or by another entity. In the embodiment depicted in FIGS. 1A-1C, site 150 contains devices 154A, 154B, 154C, and 154D, and site 160 contains devices 156A, 156B, 156C, and 156D. For ease of explanation only four devices are depicted in each of sites 150 and 160 in FIGS. 1A-1C; each site within alarm system 100 may contain any number of devices.

Communications links 170, 172, 174, and 176 may be implemented by any medium or mechanism that provides for the exchange of data between MSP 110, AIC 140, and sites 150 and 160. Examples of communications links 170, 172, 174, and 176 include, without limitation, a network such as a Local Area Network (LAN), Wide Area Network (WAN), Ethernet or the Internet, or one or more terrestrial, satellite or wireless links.

Functional Overview

An alarm system enables a MSP to accurately determine which device within a computer network is associated with a received alarm. Initially, an event is detected on a device ("the originating device") on the computer network. For example, illustrative events may include when the network bandwidth available to the originating device falls below a specified level or if the originating device experiences a specified condition, e.g., the utilization of a processor on the device is over 90%.

An alarm that is associated with the event is propagated to an alarm identification component. The alarm identification component augments the alarm with identification information to result in an augmented alarm. The augmented alarm contains additional information that may be used by the MSP to identify other information, including the identity of the particular customer site in which the alarm originated, the identity of the originating device, and geographical information associated with the customer site of the originating device.

Thereafter, the augmented alarm is transmitted to a network operations center for the computer network. The network operations center may process the alarm using the additional information in the alarm. Accordingly, using the augmented alarm, the MSP is able to accurately determine the identity of the originating device, regardless of whether the customer site of the originating device uses NAT or a private IP addressing scheme.

Communicating an Alarm in a Computer Network

Figure 2:
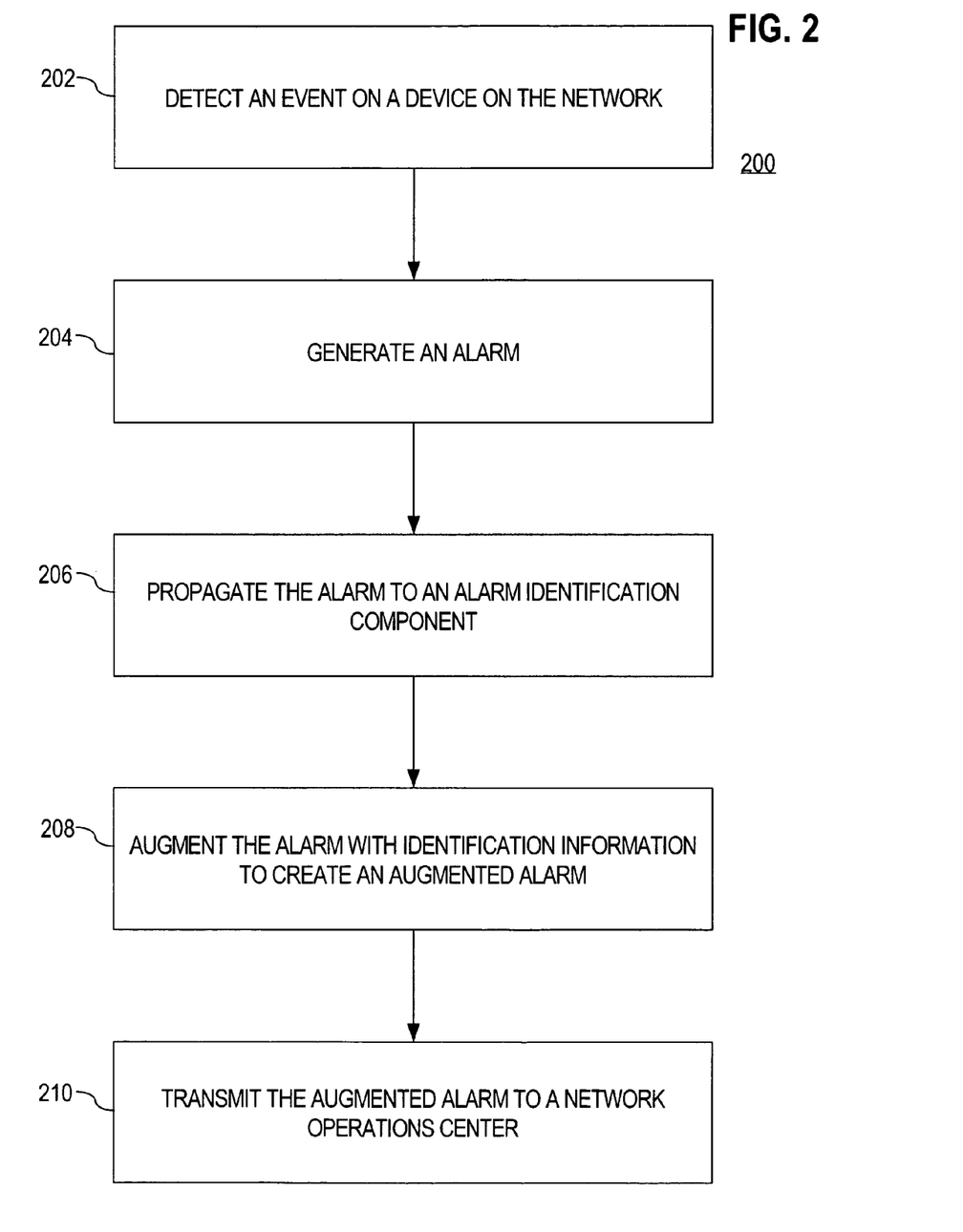
FIG. 2 is a flowchart illustrating the functional steps of communicating an alarm in a computer network according to an embodiment.

FIG. 2 is a flowchart 200 illustrating the functional steps of communicating an alarm in a computer network according to an embodiment. The term "event," as broadly used herein, refers to any action or condition upon the occurrence thereof may form the basis of an alarm. In step 202, an event that is associated with a device on the network is detected. In an embodiment, the event may be detected by the device associated with the event, or by an entity other than the device associated with the event.

For example, in FIG. 1A, if the event is associated with device 154A, then in an embodiment either device 154A or edge router 152 may be configured to detect the event. In another example, in FIG. 1B, if the event is associated with device 154A, then in an embodiment either device 154A or AIC 140 may be configured to detect the event. In another example, in FIG. 1C, if the event is associated with device 154A, then in an embodiment either device 154A, the AIC 140 on device 154A, or edge router 152 may be configured to detect the event. In other embodiments not depicted in FIGS. 1A-1C, other entities within a particular site may detect events associated with devices occurring within the particular site.

In an embodiment, step 202 may be performed by detecting a condition using a SNMP agent that is executing on the device associated with the event.

The event detected in step 202 may be associated with various levels of granularity. For example, the event detected in step 202 may be associated with a particular device or with any part of the device, e.g., a particular interface, a particular card, or a particular port. In various embodiments, events may also be detected that are associated with software systems.

In step 204, in response to detecting the event associated with the device, an alarm is generated. The alarm that is generated reflects the event that was detected. The alarm that is generated in step 204 may identify the particular event that was detected in step 202 and/or may identify, at some level, the device associated with the event detected in step 202. For example, SNMP traps and notifications store an enterprise alarm identifier, a generic alarm identifier, a specific alarm identifier, and an IP address associated with the originating device in the VarBinds portion of the SNMP message. However, the IP address associated with the originating device in the alarm generated in step 204 may not be unique across the entire network monitored by the MSP 110, e.g., NAT may be used at the site of the originating device. Thus, MSP 110 may not be able to uniquely identify the originating device simply by evaluating information contained with the alarm generated in step 204.

In an embodiment, the alarm generated in step 204 may be generated by the same entity that detected the event in step 202. In another embodiment, the entity that generates the alarm may be a different entity than the entity that detected the event in step 202. In such an embodiment, the entity that detected the event in step 202 transmits information that identifies the detected event and the device associated with the event to the entity responsible for generating the alarm. For example, the alarm may contain the IP address of the originating device. In an embodiment, the alarm generated in step 204 may be generated by one or more of the following: a switch, a router, an IP phone, a call manager component, or an event monitoring component.

In step 206, the alarm is propagated to an alarm identification component. In an embodiment, step 206 is performed by propagating the alarm to AIC 140. An event bus system, such as the CNS (Cisco Network Services) event bus, SNMP messages (as used herein, SNMP messages include both SNMP traps of SNMP v1 and the SNMP notifications of SNMP v2 and v3), Syslog events, and/or any other transport mechanism may be used to propagate alarms in step 206.

The alarm may be propagated to AIC 140 in a variety of ways, as AIC 140 may be deployed within alarm system 100 at any position that enables the AIC 140 to process received alarms. For example, in the embodiment depicted in FIG. 1A, AIC 140 is deployed outside of sites 150 and 160 that are each monitored by MSP 110. In the embodiment of FIG. 1A, site 150 and 160 may each be, although they need not be, a local area network, and AIC 140 may be, although it need not be, a router that communicates with both edge router 152 in site 150 and with edge router 162 in site 160. In the embodiment depicted in FIG. 1A, if the alarm originated within device 154A, 154B, 154C, or 154D, then the alarm would propagate to AIC 140 via communications link 176, edge router 152, and communications link 172. In the embodiment depicted in FIG. 1A, if the alarm originated within edge router 152, then the alarm would propagate to AIC 140 via communications link 172.

In the embodiment depicted in FIG. 1B, AIC 140 is deployed inside each site being monitored by MSP 110. In the embodiment depicted in FIG. 1B, if the alarm originated within device 154A, 154B, 154C, or 154D, then the alarm would propagate to AIC 140 via communications link 176. In the embodiment depicted in FIG. 1B, if the alarm originated within AIC 140, then the alarm would propagate to AIC 140 internally, i.e., the component executing on AIC 140 responsible for generating the alarm would transmit the generated alarm to the component executing on AIC 140 responsible for augmenting the generated alarm with identification information.

In the embodiment depicted in FIG. 1C, AIC 140 is deployed at each device in each site being monitored by MSP. In the embodiment depicted in FIG. 1C, if the alarm originated within device 154A, 154B, 154C, or 154D, then the alarm would propagate to AIC 140 by transmitting the alarm to the AIC 140 executing on the originating device. In the embodiment depicted in FIG. 1C, if the alarm originated within the AIC 140 executing at a particular device, then the alarm would propagate to AIC 140 internally, i.e., the component executing on AIC 140 responsible for generating the alarm would transmit the generated alarm to the component executing on AIC 140 responsible for augmenting the generated alarm with identification information.

In step 208, at the AIC 140, the alarm is augmented with identification information to result in an augmented alarm. In an embodiment, the alarm may be implemented as a SNMP message, and the identification information may be inserted into a VarBind portion of the SNMP message by the AIC 140.

In an embodiment, the identification information of step 208 identifies the particular site in which the alarm originated. For example, if the alarm originated within site 150, the identification information may identify that the alarm originated within site 150. In another embodiment, the identification information uniquely identifies a device on the network that is associated with the event that initiated the alarm. For example, if the event that resulted in the alarm was detected on device 154A, then, in an embodiment, the identification information may uniquely identify device 154A as the device associated with the event that initiated the alarm. The unique identification may comprise a device name or other unique label previously assigned by an administrator.

In another embodiment, the identification information comprises an address for the device on the network that is associated with the event that initiated the alarm. For example, if device 154A detected the event that resulted in initiating an alarm, then, in an embodiment, the identification information may comprise an address for device 154A. The address may be any address that identifies the device on the network, e.g., an IP address or a MAC address. In another embodiment, the identification information comprises geographical information associated with the particular site in which the alarm originated. For example, if the alarm originated in site 150, then, in an embodiment, the identification information may comprise geographical information associated with site 150, including, but not limited to, a zip code, a city, a state, a country, a region, and a telephone area code.

In yet another embodiment, the identification information comprises network information associated with the particular site in which the alarm originated. For example, if the alarm originated in site 150, then, in an embodiment, the identification information may comprise network information associated with site 150, including, but not limited to, information identifying the edge router of site 150, information about a private addressing scheme for site 150, and information about the network conditions of site 150.

In an additional embodiment, the identification information may identify one or more of the following: (a) rack, shelf, and/or board identifiers that are associated with the originating device, (b) slot, port, interface, and/or sub-interface identifiers that are associated with the originating device, (c) a gateway network element identifier associated with the originating device, (d) a software version identifier associated with a software application of the originating device, and (e) a firmware version identifier associated with the firmware of the originating device.

The identification information that AIC 140 uses to augment the alarm may be created using a variety of mechanisms. In an embodiment, the identification information may be created based on the address of the device associated with the alarm. For example, the AIC 140 may employ a lookup table that associates addresses of devices with unique labels, names, or other identification information. If an address associated with the device is located within an entry in the lookup table, then the corresponding identification information in that entry in the lookup table may be used by AIC 140 to augment the alarm in step 208. If the address associated with the device is not located within the lookup table, then another mechanism may be used to create the identification information.

In another embodiment, the identification information may be created based on the address of an edge router for the site in which the device associated with the alarm resides. For example, in FIG. 1A, AIC 140 may create the identification information based upon whether edge router 152 or edge router 162 transmitted the alarm to AIC 140.

Many mechanisms are available to determine which edge router transmitted the alarm to AIC 140. AIC 140 may determine whether a received alarm originated within site 150 or site 160 based upon the IP address of the node that sent the alarm. For example, if the IP address of the node that sent the alarm is the IP address of edge router 152, then AIC 140 can determine that the alarm originated within site 150, whereas if the IP address of the node that sent the alarm is the IP address of edge router 162, then AIC 140 can determine that the alarm originated within site 160. Alternatively, the trap or Syslog event will contain the address of the edge router that transmitted the alarm to AIC 140.

Alternatively or additionally, AIC 140 may employ a lookup table that associates information in the received alarm that identifies the originating device with identification information. For example, AIC 140 may use a lookup table that associates the addresses of edge routers with identification information. An address associated with each node that transmits an alarm is located within an entry in the lookup table. AIC 140 may look up and use the corresponding identification information in that entry in the lookup table to augment the alarm in step 208. If the address associated with the node that transmitted the alarm is not located within the lookup table, then another mechanism may be used to create the identification information.

In another embodiment, the AIC 140 may create the same set of identification information for each device within a site. For example, in FIG. 1A, AIC 140 may augment each alarm originating in site 150 with the same set of identification information, and AIC 140 may augment each alarm originating in site 160 with the same set of identification information (which may be different than the identification information created for devices in site 150).

AIC 140 may employ two or more techniques discussed above in a hierarchical fashion to create the identification information that is used to augment alarms in step 208. For example, AIC 140 may first employ a lookup table that associates unique information identifying the originating device (for example, a network address of the originating device) that is within the received alarm with identification information. In another technique, if the identification information cannot be created using the lookup table, then the AIC 140 may attempt to create the identification information based on the address of an edge router for the site in which the device associated with the alarm resides. According to another technique, if the identification information cannot be created based on the address of an edge router, then the AIC 140 may create the identification information based on a default set of information, e.g., a default set of identification information may be created for each device within the site in which the alarm originated.

In step 210, the augmented alarm is transmitted from the AIC 140 to the NOC 120. The NOC 120 processes the augmented alarm for the MSP 110. Because the augmented alarm includes identification information, MSP 110 may correctly identify the device associated with the augmented alarm, even if network address translation is used at the site associated with the originating device, using the identification information in the augmented alarm.

The order of the steps of flowchart 200 described above is merely illustrative. In some embodiments of the invention, the steps illustrated in flowchart 200 may be performed in parallel or in a different order than described above; consequently, embodiments of the invention are not limited to the sequence of steps illustrated in flowchart 200.

Using the techniques illustrated in flowchart 200, MSP 110 may correctly identify which device is associated with an augmented alarm, even if the device associated with the alarm shares the same IP address as another device in another site on the network due to network address translation.

For example, if sites 150 and 160 each use network address translation, and device 154A and device 156A are each assigned the same IP address, the identification information contained within the augmented alarm may be used by the MSP 110 to distinguish between device 154A and device 156A. In this example, if AIC 140 in FIG. 1A received alarms from device 154A and device 156A (each assigned to the same IP address), then AIC 140 may determine which site is associated with the alarm based on the identity of the transmitting node, i.e., edge router 152 or edge router 162. Once the originating site is determined for the alarm, AIC 140 may distinguish between device 154A and device 156A that each share the same private IP address ("the identified private IP address"), as only one device at the originating site has the identified private IP address. Thereafter, the ACI 140 may augment the alarm using identification information that reflects the originating site and/or the originating device.

Using the augmented alarm, the MSP is able to accurately determine the identity of the originating device, regardless of whether the customer site of the originating device uses NAT or a private IP addressing scheme.

Moreover, applications at the MSP 110 may need additional information associated with the alarm to facilitate the processing the alarm. The NOC 120 may provide those applications with the identification information, contained within the augmented alarms, to facilitate the processing of the alarm by the application.

Using the techniques illustrated in flowchart 200, MSP 110 may create a view of the augmented received alarms at the NOC 120 by filtering the augmented alarms using a set of criteria, without the need to consult any further sources of information, e.g., a lookup table or database. The created view may be used by the MSP 110 to obtain an accurate view of the received alarms at the NOC 120. Even if an originating device associated with an augmented alarm received by the NOC 120 was not previously known to the MSP 110, the previously unknown originating device may be included in the created view because the MPS 110 can identify which site is associated with the previously unknown originating device using the identification information in the augmented alarm.

In am embodiment of the invention, MSP 110 may allow a user at a particular site to create a view of the augmented received alarms at the NOC 120 by filtering the augmented alarms using a set of criteria in a similar fashion as the MSP 110 would. The MPS 110 may impose certain restrictions on the set of criteria a user associated with a site may filter upon, e.g., MPS 110 may only allow a user at a particular site to create a view of alarms received at the NOC 120 associated with that particular site to ensure the privacy of other sites not associated with the user.

Implementing Mechanisms

Figure 3:
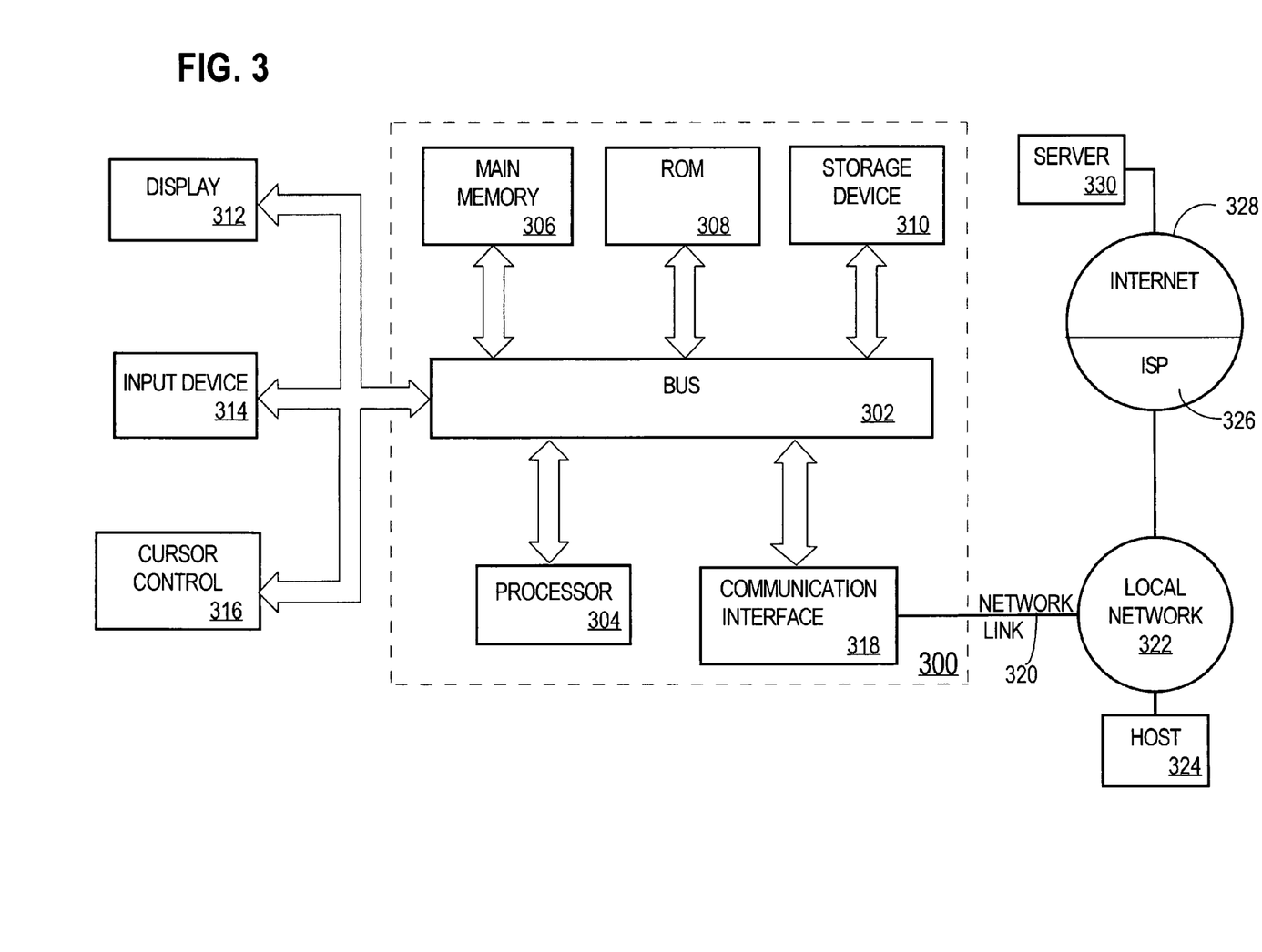
FIG. 3 is a block diagram that illustrates a computer system upon which an embodiment may be implemented.

FIG. 3 is a block diagram that illustrates a computer system 300 upon which an embodiment may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allow the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for communicating an alarm in a computer network, comprising:
   a network device detecting an event within the network device on the computer network, wherein the network device is included in a particular site in a plurality of sites, and wherein the event results from a change in operation of the network device;
   in response to detecting the event, the network device generating and propagating an alarm to an alarm identification component that is hosted within the network device;
   the alarm identification component augmenting the alarm with identification information to create an augmented alarm, wherein the identification information uniquely identifies the particular site among the plurality of sites; and
   transmitting the augmented alarm to a network operations center for the computer network, wherein the network operations center is external to the particular site and the network operations center processes alarms for each site in the plurality of sites,
   wherein the step of augmenting the alarm further comprises:
      determining whether the identification information can be created based on a table that maps network device addresses to identification information;
      when the identification information can not be created based on the table, determining whether the identification information can be created based on an address of an edge router for the particular site; and
      when the identification information can not be created based on an address of the edge router for the particular site, creating the identification information using default identification information.

2. The method of claim 1, wherein the identification information comprises a first portion and a second portion, wherein the first portion uniquely identifies the particular site among the plurality of sites and the second portion includes a MAC address of the network device.

3. The method of claim 1, wherein the identification information comprises a first portion and a second portion, wherein the first portion uniquely identifies the particular site among the plurality of sites and the second portion uniquely identifies the network device on the computer network.

4. The method of claim 1, wherein the identification information comprises a first portion and a second portion, wherein the first portion uniquely identifies the particular site among the plurality of sites and the second portion includes an IP address for the network device on the computer network.

5. The method of claim 1, wherein the identification information comprises a first portion and a second portion, wherein the first portion uniquely identifies the particular site among the plurality of sites and the second portion includes geographical information associated with the particular site in which the alarm originated.

6. The method of claim 1, wherein the identification information comprises a first portion and a second portion, wherein the first portion uniquely identifies the particular site among the plurality of sites and the second portion includes network information associated with the particular site in which the alarm originated.

7. The method of claim 1, wherein the alarm identification component is a first alarm identification component and a second alarm identification component is hosted by an edge router associated with the particular site.

8. The method of claim 1, wherein the alarm identification component is a first alarm identification component, each site in the plurality of sites is a local area network, a second alarm identification component is hosted by a router that communicates with one or more edge routers, and wherein each of the one or more edge routers is associated with a different site in the plurality of sites.

9. The method of claim 1, wherein the alarm identification component is a first alarm identification component, the network device is a first network device, and a second alarm identification component is hosted by a second network device that is included in the particular site.

10. The method of claim 1, wherein the step of the alarm identification component augmenting the alarm with identification information comprises:
    conveying the identification information in a VarBind portion of a SNMP message associated with the alarm.

11. The method of claim 1, wherein the step of detecting the event comprises:
    detecting a condition using a SNMP agent that is in the network device.

12. The method of claim 1, wherein the step of propagating the alarm to the alarm identification component is performed by transmission of a SNMP message, a Syslog event, or a CNS bus event.

13. The method of claim 1 wherein: the network device is selected from the group consisting of: a switch, a router, an IP phone, a call manager component, a voice mail component, and an event monitoring component.

14. The method of claim 1, further comprising the step of: creating the identification information based on an address of the network device on the computer network.

15. The method of claim 1, further comprising the step of: creating the identification information based on an address of an edge router for the particular site.

16. The method of claim 1, further comprising the step of: creating the identification information based on a table that maps network device addresses to identification information.

17. The method of claim 1, wherein the identification information is the same for each alarm originating in the particular site.

18. The method of claim 1, wherein the particular site uses network address translation.

19. The method of claim 1, wherein the network device is a first network device, wherein a second network device is included in a different site in the plurality of sites than the particular site that includes the first device, wherein the first device and the second device are associated with an IP address that is the same for both the first device and the second device, and wherein the identification information allows the network operations center to determine that the augmented alarm is for the first network device instead of the second network device.

20. The method of claim 1, wherein the augmented alarm is included in a plurality of augmented alarms received at the network operations center, wherein the plurality of augmented alarms includes one or more augmented alarms from each site of the plurality of sites, wherein said each one or more augmented alarms is based on identification information that uniquely identifies said each site among the plurality of sites, and wherein the network operations center creates a view comprising a subset of the plurality of augmented alarms corresponding to the particular site by filtering the plurality of augmented alarms based on the identification information that uniquely identifies the particular site among the plurality of sites.

21. A computer-readable volatile or non-volatile medium, storing one or more sequences of instructions for communicating an alarm in a computer network, wherein execution of the one or more sequences of instructions by one or more processors causes the one or more processors to perform the steps of:

a network device detecting an event within the network device on the computer network, wherein the network device is included in a particular site in a plurality of sites, and wherein the event results from a change in operation of the network device;

in response to detecting the event, the network device generating and propagating an alarm to an alarm identification component that is hosted within the network device;

the alarm identification component augmenting the alarm with identification information to create an augmented alarm, wherein the identification information uniquely identifies the particular site among the plurality of sites; and transmitting the augmented alarm to a network operations center for the computer network, wherein the network operations center is external to the particular site and the network operations center processes alarms for each site in the plurality of sites, wherein the step of augmenting the alarm further comprises:

determining whether the identification information can be created based on a table that maps network device addresses to identification information;

when the identification information can not be created based on the table, determining whether the identification information can be created based on an address of an edge router for the particular site; and when the identification information can not be created based on an address of the edge router for the particular site, creating the identification information using default identification information.

22. The computer-readable medium of claim 21, wherein the identification information comprises a first portion and a second portion, wherein the first portion uniquely identifies the particular site among the plurality of sites and the second portion includes a MAC address of the network device.

23. The computer-readable medium of claim 21, wherein the identification information comprises a first portion and a second portion, wherein the first portion uniquely identifies the particular site among the plurality of sites and the second portion uniquely identifies the network device on the computer network.

24. The computer-readable medium of claim 21, wherein the identification information comprises a first portion and a second portion, wherein the first portion uniquely identifies the particular site among the plurality of sites and the second portion includes an IP address for the network device on the computer network.

25. The computer-readable medium of claim 21, wherein the identification information comprises a first portion and a second portion, wherein the first portion uniquely identifies the particular site among the plurality of sites and the second portion includes geographical information associated with the particular site in which the alarm originated.

26. The computer-readable medium of claim 21, wherein the identification information comprises a first portion and a second portion, wherein the first portion uniquely identifies the particular site among the plurality of sites and the second portion includes network information associated with the particular site in which the alarm originated.

27. The computer-readable medium of claim 21, wherein the alarm identification component is a first alarm identification component and a second alarm identification component is hosted by an edge router associated with the particular site.

28. The computer-readable medium of claim 21, wherein the alarm identification component is a first alarm identification component, each site in the plurality of sites is a local area network, a second alarm identification component is hosted by a router that communicates with one or more edge routers, and wherein each of the one or more edge routers is associated with a different site in the plurality of sites.

29. The computer-readable medium of claim 21, wherein the alarm identification component is a first alarm identification component, the network device is a first network device, and a second alarm identification component is hosted by a second network device that is included in the particular site.

30. The computer-readable medium of claim 21, wherein the step of the alarm identification component augmenting the alarm with identification information comprises:

conveying the identification information in a VarBind portion of a SNMP message associated with the alarm.

31. The computer-readable medium of claim 21, wherein the step of detecting the event comprises:

detecting a condition using a SNMP agent that is in the network device.

32. The computer-readable medium of claim 21, wherein the step of propagating the alarm to the alarm identification component is performed by transmission of a SNMP message, a Syslog event, or a CNS bus event.

33. The computer-readable medium of claim 21, wherein: the network device is selected from the group consisting of: a switch, a router, an IP phone, a call manager component, a voice mail component, and an event monitoring component.

34. The computer-readable medium of claim 21, wherein execution of the one or more sequences of instructions on each computer-readable storage medium by the one or more processors causes the one or more processors to further perform the step of:
creating the identification information based on an address of the network device on the computer network.

35. The computer-readable medium of claim 21, wherein execution of the one or more sequences of instructions on each computer-readable storage medium by the one or more processors causes the one or more processors to further perform the step of:
creating the identification information based on an address of an edge router for the particular site.

36. The computer-readable medium of claim 21, wherein execution of the one or more sequences of instructions on each computer-readable storage medium by the one or more processors causes the one or more processors to further perform the step of:
creating the identification information based on a table that maps network device addresses to identification information.

37. The computer-readable medium of claim 21, wherein the identification information is the same for each alarm originating in the particular site.

38. The computer-readable medium of claim 21, wherein the particular site uses network address translation.

39. The computer-readable medium of claim 21, wherein the network device is a first network device, wherein a second network device is included in a different site in the plurality of sites than the particular site that includes the first device, wherein the first device and the second device are associated with an IP address that is the same for both the first device and the second device, and wherein the identification information allows the network operations center to determine that the augmented alarm is for the first network device instead of the second network device.

40. The computer-readable medium of claim 21, wherein the augmented alarm is included in a plurality of augmented alarms received at the network operations center, wherein the plurality of augmented alarms includes one or more augmented alarms from each site of the plurality of sites, wherein said each one or more augmented alarms is based on identification information that uniquely identifies said each site among the plurality of sites, and wherein creates a view comprising a subset of the plurality of augmented alarms corresponding to the particular site by filtering the plurality of augmented alarms based on the identification information that uniquely identifies the particular site among the plurality of sites.

41. A system for communicating an alarm in a computer network, comprising:
one or more processors;
means for a network device detecting an event within the network device on the computer network, wherein the network device is included in a particular site in a plurality of sites, and wherein the event results from a change in operation of the network device;
means for the network device generating and propagating an alarm to an alarm identification means that is hosted within the network device, in response to detecting the event;
means for the alarm identification means augmenting the alarm with identification information to create an augmented alarm, wherein the identification information uniquely identifies the particular site among the plurality of sites;
means for transmitting the augmented alarm to a network operations center for the computer network, wherein the network operations center is external to the particular site and the network operations center processes alarms for each site in the plurality of sites,
means for determining whether the identification information can be created based on a table that maps network device addresses to identification information;
means for determining whether the identification information can be created based on an address of an edge router for the particular site when the identification information can not be created based on the table; and
means for creating the identification information using default identification information when the identification information can not be created based on an address of the edge router for the particular site.

42. The system of claim 41, wherein the identification information comprises a first portion and a second portion, wherein the first portion uniquely identifies the particular site among the plurality of sites and the second portion includes a MAC address of the network device.

43. The system of claim 41, wherein the identification information comprises a first portion and a second portion, wherein the first portion uniquely identifies the particular site among the plurality of sites and the second portion uniquely identifies the network device on the computer network.

44. The system of claim 41, wherein the identification information comprises a first portion and a second portion, wherein the first portion uniquely identifies the particular site among the plurality of sites and the second portion includes an IP address for the network device on the computer network.

45. The system of claim 41, wherein the identification information comprises a first portion and a second portion, wherein the first portion uniquely identifies the particular site among the plurality of sites and the second portion includes geographical information associated with the particular site in which the alarm originated.

46. The system of claim 41, wherein the identification information comprises a first portion and a second portion, wherein the first portion uniquely identifies the particular site among the plurality of sites and the second portion includes network information associated with the particular site in which the alarm originated.

47. The system of claim 41, wherein the alarm identification means is a first alarm identification means and a second alarm identification means is hosted by an edge router associated with the particular site.

48. The system of claim 41, wherein the alarm identification means is a first alarm identification means, each site in the plurality of sites is a local area network, a second alarm identification means is hosted by a router that communicates with one or more edge routers, and wherein each of the one or more edge routers is associated with a different site in the plurality of sites.

49. The system of claim 41, wherein the alarm identification means a first alarm identification means, the network device is a first network device, and a second alarm identification means is hosted by a second network device that is included in the particular site.

50. The system of claim 41, wherein the means for the alarm identification means augmenting the alarm with identification information comprises:
means for conveying the identification information in a VarBind portion of a SNMP message associated with the alarm.

51. The system of claim 41, wherein the means for detecting the event comprises:
means for detecting a condition using a SNMP agent that is in the network device.

52. The system of claim 41, wherein the means for propagating the alarm to the alarm identification means is performed by a means for transmitting a SNMP message, a Syslog event, or a CNS bus event.

53. The system of claim 41, wherein: the network device is selected from the group consisting of: a switch, a router, an IP phone, a call manager component, a voice mail component, and an event monitoring component.

54. The system of claim 41, further comprising:
means for creating the identification information based on an address of the network device on the computer network.

55. The system of claim 41, further comprising:
means for creating the identification information based on an address of an edge router for the particular site.

56. The system of claim 41, further comprising:
means for creating the identification information based on a table that maps network device addresses to identification information.

57. The system of claim 41, wherein identification information is the same for each alarm originating in the particular site.

58. The system of claim 41, wherein the particular site uses network address translation.

59. The system of claim 41, wherein the network device is a first network device, wherein a second network device is included in a different site in the plurality of sites than the particular site that includes the first device, wherein the first device and the second device are associated with an IP address that is the same for both the first device and the second device, and wherein the identification information allows the network operations center to determine that the augmented alarm is for the first network device instead of the second network device.

60. The system of claim 41, wherein the augmented alarm is included in a plurality of augmented alarms received at the network operations center, wherein the plurality of augmented alarms includes one or more augmented alarms from each site of the plurality of sites, wherein said each one or more augmented alarms is based on identification information that uniquely identifies said each site among the plurality of sites, and wherein the network operations center creates a view comprising a subset of the plurality of augmented alarms corresponding to the particular site by filtering the plurality of augmented alarms based on the identification information that uniquely identifies the particular site among the plurality of sites.

61. A system for communicating an alarm in a computer network, comprising:
one or more processors; and
one or more computer-readable mediums that each carry one or more sequences of instructions for communicating an alarm in a computer network, wherein execution of the one or more sequences of instructions on each computer-readable storage medium by the one or more processors causes the one or more processors to perform the steps of:
a network device detecting an event within the network device on the computer network, wherein the network device is included in a particular site in a plurality of sites, and wherein the event results from a change in operation of the network device;
in response to detecting the event, the network device generating and propagating an alarm to an alarm identification component that is hosted within the network device;
the alarm identification component augmenting the alarm with identification information to create an augmented alarm, wherein the identification information uniquely identifies the particular site among the plurality of sites; and
transmitting the augmented alarm to a network operations center for the computer network, wherein the network operations center is external to the particular site and the network operations center processes alarms for each site in the plurality of sites, wherein the step of augmenting the alarm further comprises:
determining whether the identification information can be created based on a table that maps network device addresses to identification information;
when the identification information can not be created based on the table, determining whether the identification information can be created based on an address of an edge router for the particular site; and
when the identification information can not be created based on an address of the edge router for the particular site, creating the identification information using default identification information.

62. The system of claim 61, wherein the identification information comprises a first portion and a second portion, wherein the first portion uniquely identifies the particular site among the plurality of sites and the second portion includes a MAC address of the network device.

63. The system of claim 61, wherein the identification information comprises a first portion and a second portion, wherein the first portion uniquely identifies the particular site among the plurality of sites and the second portion uniquely identifies the network device on the computer network.

64. The system of claim 61, wherein the identification information comprises a first portion and a second portion, wherein the first portion uniquely identifies the particular site among the plurality of sites and the second portion includes an IP address for the network device on the computer network.

65. The system of claim 61, wherein the identification information comprises a first portion and a second portion, wherein the first portion uniquely identifies the particular site among the plurality of sites and the second portion includes geographical information associated with the particular site in which the alarm originated.

66. The system of claim 61, wherein the identification information comprises a first portion and a second portion, wherein the first portion uniquely identifies the particular site among the plurality of sites and the second portion includes network information associated with the particular site in which the alarm originated.

67. The system of claim 61, wherein the alarm identification component is a first alarm identification component and a second alarm identification component is hosted by an edge router associated with the particular site.

68. The system of claim 61, wherein the alarm identification component is a first alarm identification component, each site in the plurality of sites is a local area network, a second alarm identification component is hosted by a router that communicates with one or more edge routers, and wherein each of the one or more edge routers is associated with a different site in the plurality of sites.

69. The system of claim 61, wherein the alarm identification component is a first alarm identification component, the network device is a first network device, and a second alarm identification component is hosted by a second network device that is included in the particular site.

70. The system of claim 61, wherein the step of the alarm identification component augmenting the alarm with identification information comprise:
conveying the identification information in a VarBind portion of a SNMP message associated with the alarm.

71. The system of claim 61, wherein the step of detecting the event comprises:
detecting a condition using a SNMP agent that is in the network device.

72. The system of claim 61, wherein the step of propagating the alarm to the alarm identification component is performed by transmission of a SNMP message, a Syslog event, or a CNS bus event.

73. The system of claim 61, wherein: execution of the one or more sequences of instructions on each computer-readable storage medium by the one or more processors causes the one or more processors to further perform the step of: in response to detecting the event associated with the device, generating the alarm at one member the network device is selected from the group consisting of: a switch, a router, an IP phone, a call manager component, a voice mail component, and an event monitoring component.

74. The system of claim 61, wherein execution of the one or more sequences of instructions on each computer-readable storage medium by the one or more processors causes the one or more processors to further perform the step of:
creating the identification information based on an address of the network device on the computer network.

75. The system of claim 61, wherein execution of the one or more sequences of instructions on each computer-readable storage medium by the one or more processors causes the one or more processors to further perform the step of:
creating the identification information based on an address of an edge router for the particular site.

76. The system of claim 61, wherein execution of the one or more sequences of instructions on each computer-readable storage medium by the one or more processors causes the one or more processors to further perform the step of:
creating the identification information based on a table that maps network device addresses to identification information.

77. The system of claim 61, wherein the identification information is the same for each alarm originating in the particular site.

78. The system of claim 61, wherein the particular site uses network address translation.

79. The system of claim 61, wherein the network device is a first network device, wherein a second network device is included in a different site in the plurality of sites than the particular site that includes the first device, wherein the first device and the second device are associated with an IP address that is the same for both the first device and the second device, and wherein the identification information allows the network operations center to determine that the augmented alarm is for the first network device instead of the second network device.

80. The system of claim 61, wherein the augmented alarm is included in a plurality of augmented alarms received at the network operations center, wherein the plurality of augmented alarms includes one or more augmented alarms from each site of the plurality of sites, wherein said each one or more augmented alarms is based on identification information that uniquely identifies said each site among the plurality of sites, and wherein the network operations center creates a view comprising a subset of the plurality of augmented alarms received at the network operations center by filtering the plurality of augmented alarms using a set of criteria.

* * * * *